W. E. BUFFAT.
FRICTION GEARING.
APPLICATION FILED MAR. 14, 1916.
1,229,879.
Patented June 12, 1917.
2 SHEETS—SHEET 1.
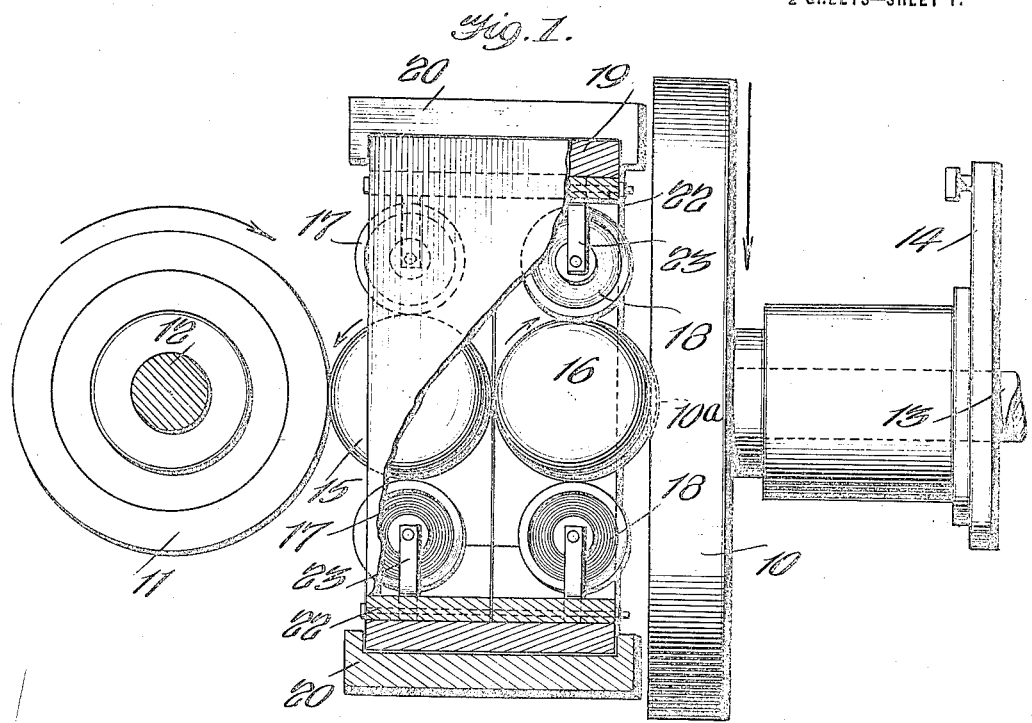
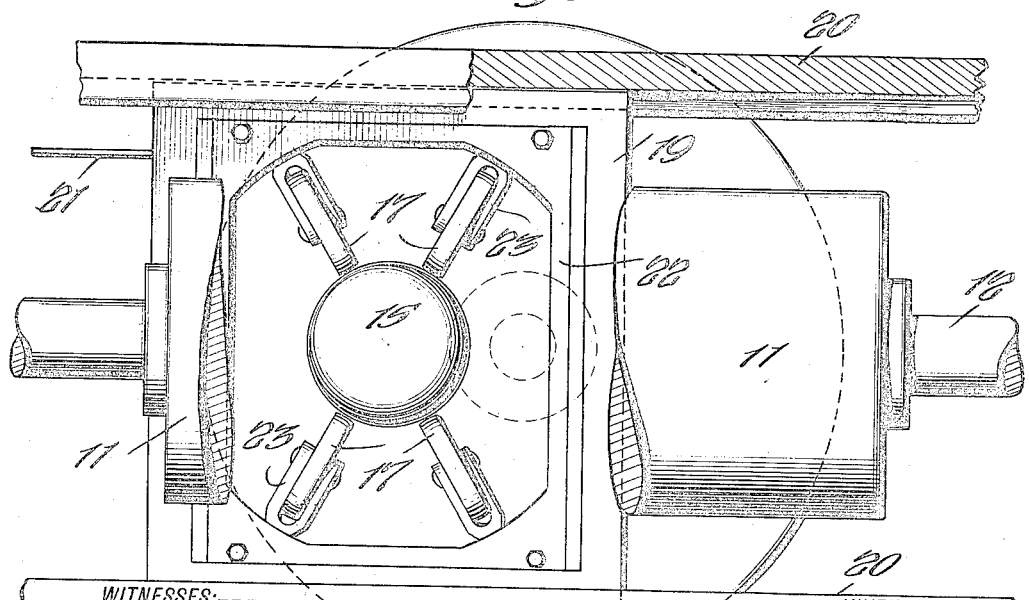
WITNESSES:
E. W. Caraghan
Myron J. Clear
INVENTOR
WILLIAM E. BUFFAT,
BY
Munn & Co
ATTORNEYS

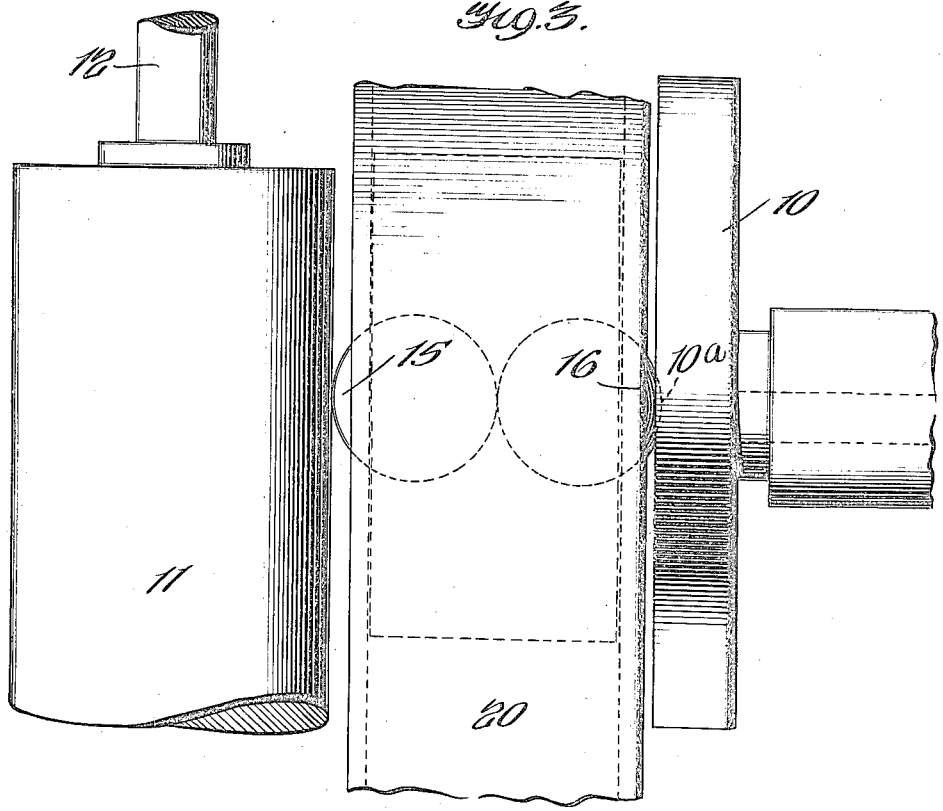
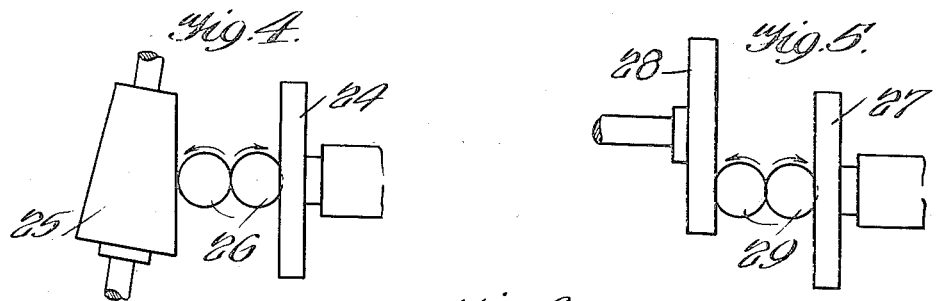
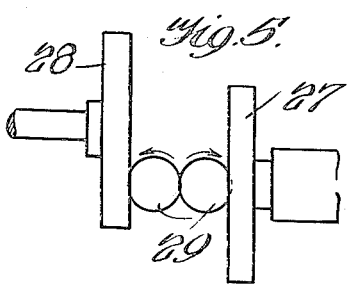
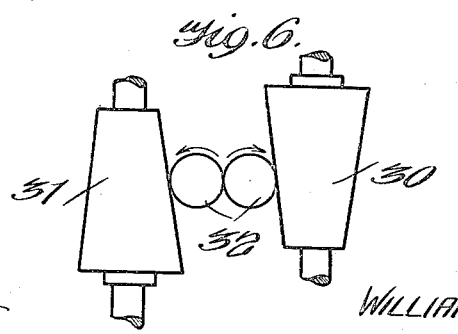

UNITED STATES PATENT OFFICE.

WILLIAM E. BUFFAT, OF KNOXVILLE, TENNESSEE.

FRICTION-GEARING.

1,229,879. Specification of Letters Patent. Patented June 12, 1917.

Application filed March 14, 1916. Serial No. 84,107.

*To all whom it may concern:*

Be it known that I, WILLIAM E. BUFFAT, a citizen of the United States, and a resident of Knoxville, in the county of Knox and State of Tennessee, have invented a certain new and useful Improvement in Friction-Gearing, of which the following is a specification.

My present invention relates generally to friction gearing, and more particularly to improvements in the adjustable member connecting the driving and driven members in a friction gearing, and adjustable therebetween to vary the speed of movement transmitted from one to the other, my object being to provide a friction connection of this character which will do away with all the difficulties, and obviate many of the disadvantages, of the disk usually used for this purpose.

In the usual form of friction transmission mechanism, a small friction disk is utilized on a feathered shaft working against the face of the driving disk, and this arrangement has two serious objections, first, the rapid wear of the friction disk and, second, the fact that when pressure is applied to obtain driving force, it is practically impossible to move the disk across the face of the driving member. The rapid wear on the small disk is due to the fact that the disk engages at its opposite edges parts of the driving disk of different radii, thus producing more or less of a grinding action.

In the accompanying drawing in which I have shown the preferred embodiment of my invention:

Figure 1 is a side view partly broken away and in section, illustrating the several parts thereof.

Fig. 2 is a face view partly broken away and in section.

Fig. 3 is a top plan view.

Figs. 4, 5, and 6, are diagrammatic plan views illustrating different forms of driving and driven members between which my invention is applicable.

Referring now to these figures and particularly to Figs. 1 to 3 inclusive, I have shown a driving disk at 10 and a driven member at 11, the latter in the form of a cylinder upon the driven shaft 12.

The driving disk 10 has movement longitudinally with the driving shaft 13, which movement may be effected through a lever 14, as seen in Fig. 1, having suitable connections within reach of the control operator, so as to adjust the disk 10 toward the driven member 11 and thus obtain desired pressure and driving force upon the friction connecting members therebetween.

In accordance with my present improvements, the friction connections between the driving and driven members consist of a pair of axially alined spherical connecting members 15 and 16, the former engaging the driven member and the latter engaging the driving member, these connecting members being supported between independent sets of casters 17 and 18 disposed in radial series therearound and having their support in a frame 19, the upper and lower edges of which are slidable in guides 20 to permit movement of the frame with the casters 18 and connecting members 15 and 16 across the face of the driving disk 10, such movement being effected through a shifting connection 21, which as usual leads to the shifting lever convenient to the control operator.

It will be noted that the frame 19 is substantially rectangular for this purpose and is provided with an inner rectangular frame 22 to which the caster supports 23 are directly connected, frame 22 having slight play with respect to the frame 19 to permit of desired flexibility. It is also to be particularly noted that the series of casters 17 and 18 of each of the spheres 15 and 16 are set to engage the particular sphere at points outwardly beyond the vertical plane of their axes, so as to maintain the spheres constantly in contact, even when pressure is released between the same and the driving and driven members, whereby to prevent rattling and eliminate undue wear.

From this it will be seen that I may shift the connections between the driving and driven members to vary the speed of movement of the latter, or its direction of movement, even when pressure is applied to the parts to obtain the desired driving force, and that, under normal conditions, the connections will operate to transmit power without the usual wear and tear of the ordinary adjustable disk, either as regards the disk itself or to the driving and driven members.

It is also to be particularly observed that, although I have shown the connecting members between driving and driven members of the type before described, they are equally applicable between a driving disk and a driven cone, between driving and driven disks, and between driving and driven cones, as respectively illustrated in Figs. 4, 5, and 6, as well as to other combinations of driving and driven members of the same general type.

In Fig. 4 the driving disk is seen at 24, the driven cone at 25, and the connecting members at 26 therebetween. In Fig. 5 the driving disk appears at 27, the driven disk at 28, and the connecting members at 29 therebetween. In Fig. 6 the driving cone appears at 30, the driven cone at 31, and the connecting members at 32 therebetween, the connecting members in each instance being, as before described, in connection with Figs. 1 to 3 inclusive.

It is to be further noted that, as the casters 17 and 18 are supported, as before stated, radially of, and in series around, the balls 15 and 16, the latter are free at all times to rotate in all directions. The several casters of each ball will be in constant contact therewith and necessarily the same distance at all times from the center thereof, thus obviously reducing friction to a minimum in the shifting movement of the balls across the face of the disk.

The driving disk 10 is also provided with a central depression or cavity 10ª, so that when the balls are moved to neutral position, the driving disk may rotate without driving the balls and without danger of grinding action.

I claim:—

1. In a friction gearing, the combination with a driving member and a driven member whose axes lie in a common plane, of friction connections therebetween including a pair of spherical members having parallel axes disposed in the said common plane of the driving and driven members, casters disposed in a series around each of said connecting members radially thereof and in contact therewith beyond the vertical plane of the axis thereof, whereby to normally hold the connecting members in contact with one another, a frame to which said casters are connected, a second frame in which said first frame is loosely supported, and guides in which said last named frame is slidably disposed whereby to permit of adjusting movements of the connecting members between the driving and driven members.

2. In a friction gearing, the combination with driving and driven members whose axes lie in a common plane, of friction connections therebetween including a pair of spherical connecting members having parallel axes disposed in the said common plane of the axes of said driving and driven members and in contact with one another, a series of radially disposed casters around each of the said connecting members and in contact therewith, whereby to support the same, and a frame in which said casters are supported, movable within the space between the driving and driven members, for the purpose described.

3. In a friction gearing, the combination with driving and driven members whose axes lie in a common plane, of friction connections therebetween including spherical connecting members in contact with one another, and with the driving and driven members, said connecting members having parallel axes disposed in the said common plane of said driving and driven members, and an adjustable support in which the said connecting members are mounted and rotatable in all directions.

4. In a friction gearing, the combination with driving and driven members whose axes lie in a common plane, of friction connections therebetween including spherical connecting members in contact with one another, and with the driving and driven members, said connecting members having parallel axes disposed in the said common plane of said driving and driven members, and a support in which the said connecting members are mounted and movable in all directions, said support being movable in the space between the driving and driven members.

WILLIAM E. BUFFAT.